US006923720B2

(12) United States Patent
Loose

(10) Patent No.: US 6,923,720 B2
(45) Date of Patent: Aug. 2, 2005

(54) SYNCHRONIZATION OF DISPLAY INDICIA ON STANDALONE GAMING MACHINES

(75) Inventor: Timothy C. Loose, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 196 days.

(21) Appl. No.: 10/042,580

(22) Filed: Jan. 9, 2002

(65) Prior Publication Data

US 2003/0130033 A1 Jul. 10, 2003

(51) Int. Cl.[7] .................................................. A63F 13/00

(52) U.S. Cl. ............................. 463/16; 463/20; 463/31; 463/42

(58) Field of Search ............................. 463/31, 40, 30, 463/16, 42; 273/121 B

(56) References Cited

U.S. PATENT DOCUMENTS 5,472,195 A * 12/1995 Takemoto et al. ............ 463/31
5,759,102 A * 6/1998 Pease et al. .................. 463/42
5,770,533 A * 6/1998 Franchi ........................ 463/42
5,851,148 A * 12/1998 Brune et al. .................. 463/25
2002/0160826 A1 * 10/2002 Gomez et al. ................ 463/16

FOREIGN PATENT DOCUMENTS

WO WO01/19475 A1 3/2001 ............. A63F/9/24

* cited by examiner

*Primary Examiner*—Jessica Harrison
*Assistant Examiner*—Corbett Cobum
(74) *Attorney, Agent, or Firm*—Jenkens & Gilchrist

(57) ABSTRACT

A method and gaming machine for generating display indicia in synchronization with an adjacent gaming machine is disclosed. The gaming machine includes a display, an emitter, and a sensor. The sensor detects a first signal from the adjacent machine. In response to the first signal or a game-related event in a game executed on the machine, the machine generates the display indicia on the display and emits a second signal from the emitter. The display indicia may vary depending upon whether it is generated in response to the first signal or in response to the game-related event. The second signal may be detected by yet another adjacent gaming machine which, in turn, generates the display indicia on its display.

20 Claims, 2 Drawing Sheets

SYNCHRONIZATION OF DISPLAY INDICIA ON STANDALONE GAMING MACHINES

FIELD OF THE INVENTION

The present invention relates generally to gaming machines and, more particularly, to a method and gaming machine for generating display indicia, such as flashing lamps or video elements, in synchronization with an adjacent gaming machine.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator.

In one proposed approach for attracting players to gaming machines, an attract display image is spatially or temporally coordinated among a group of adjacent gaming machines to provide viewers with an impression that the gaming machines are linked to one another. The image may, for example, be displayed sequentially on one display after another to give the general impression of the image moving sequentially through the gaming machines in the group. In order to coordinate the displays of the different gaming machines, the machines must be physically linked to a controller device and possibly each other using a backbone communication architecture, daisy chain architecture, hub-and-spoke architecture, or the like. The controller device may be physically separate from the machines or integrated with one of the machines. A drawback of the above construction is that it adds to the cost of manufacture and may require additional submissions to regulatory agencies that must approve gaming products to be installed in gaming establishments in their respective jurisdictions. Accordingly, a need exists for a method of synchronizing display indicia on standalone gaming machines without requiring the machines to be physically linked to a controller device or to each other.

SUMMARY OF THE INVENTION

These and other objects are realized by a method and gaming machine for generating display indicia in synchronization with an adjacent gaming machine. The gaming machine includes a display, an emitter, and a sensor. The sensor detects a first signal from the adjacent machine. In response to the first signal or a game-related event in a game executed on the machine, the machine generates the display indicia on the display and emits a second signal from the emitter. The display indicia may vary depending upon whether it is generated in response to the first signal or in response to the game-related event. The second signal may be detected by yet another adjacent gaming machine which, in turn, generates the display indicia on its display.

BRIEF DESCRIPTION OF THE DRAWINGS

The foregoing and other advantages of the invention will become apparent upon reading the following detailed description and upon reference to the drawings.

Figure 1:
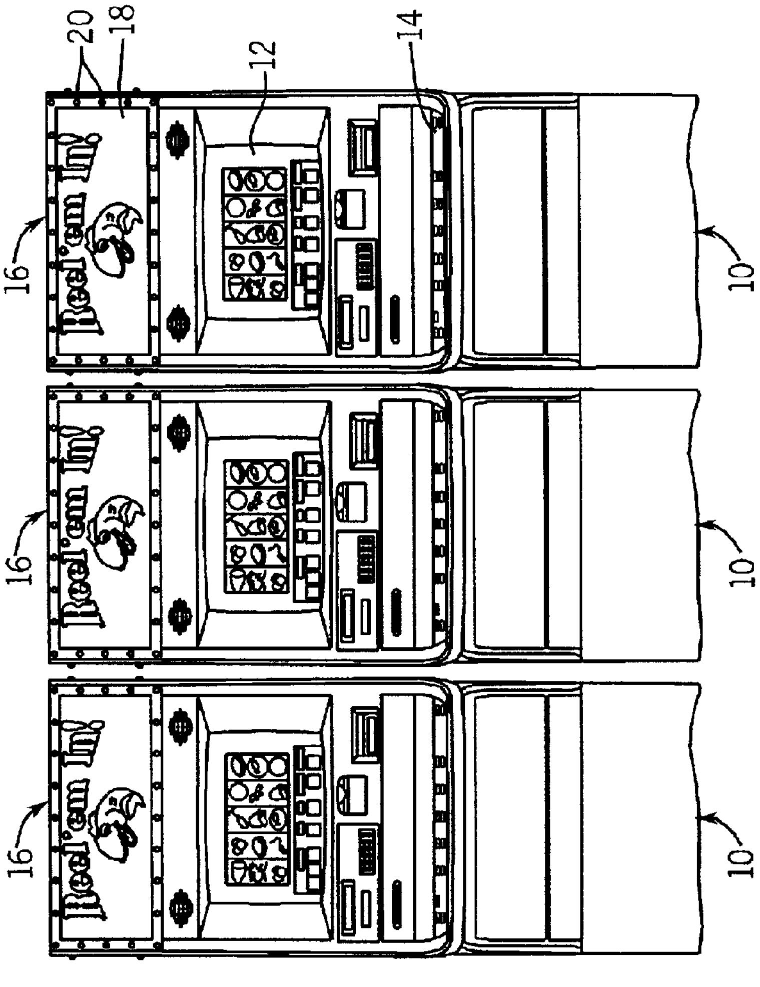
FIG. 1 is a front view of a bank of adjacent gaming machines operable to generate synchronized display indicia in accordance with the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, there is depicted a bank of adjacent gaming machines 10 operable to generate synchronized display indicia in accordance with the present invention. Each gaming machine 10 is operable to play a game of chance such as mechanical or video slots, poker, blackjack, keno, or bingo. In response to a wager, a central processing unit (CPU) within the machine 10 randomly selects a basic game outcome from a plurality of possible outcomes and visually represents the selected outcome on a display such as a video display 12. If the selected outcome corresponds to a winning outcome, the player is awarded a payout identified on a pay table for that winning outcome.

One or more of the basic game outcomes may trigger a bonus feature. The bonus feature may be played on the video display 12 or a secondary mechanical or video bonus indicator distinct from the video display 12. If the bonus feature is played on the video display 12, the bonus feature may utilize the display images of the basic game (e.g., slot reels in a slot game) or may replace the basic game images with bonus-specific images. The bonus feature may be interactive and require a player to make one or more selections to earn bonus amounts. Also, the bonus feature may depict one or more animated events and award bonus amounts based on an outcome of the animated events. Upon completion of the bonus feature, the CPU shifts operation back to the basic game.

Each gaming machine 10 includes a plurality of push buttons on a button panel 14 for operating the gaming machine. In addition, a touch screen may be mounted by adhesive, tape, or the like over a front surface of the display 12. The touch screen contains soft touch keys denoted by graphics on the underlying display 12 and used to operate the gaming machine 10. The touch keys may be used to implement the same functions as the push buttons, as well as additional functions depending upon the level of player interaction demanded by the game. A player can then enable a desired function either by touching the touch screen at an appropriate touch key or by pressing an appropriate push-button on the button panel 14.

Figure 2:
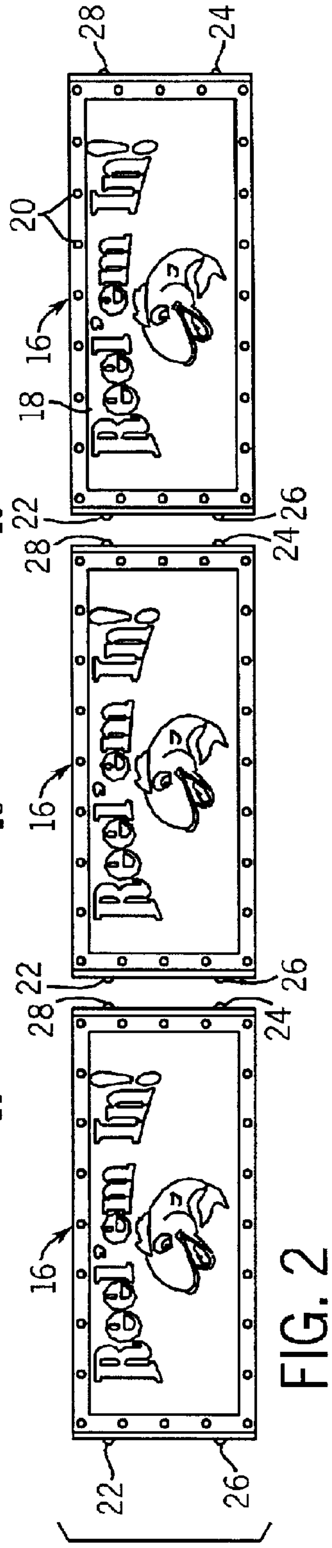
FIG. 2 is an enlarged front view of the top box displays of the respective gaming machines.

To assist in attracting players to the gaming machines 10, each gaming machine 10 includes a top box display 16. FIG. 2 is an enlarged front view of the top box displays 16 of the respective gaming machines 10. The top box display 16 may be rectangular as shown or have any other desired configuration. The top box display 16 preferably includes a backlit glass marquee 18 surrounded by a plurality of miniature lamps 20. The marquee 18 may, for example, include artwork relating to a theme of the game executed on the gaming machine 10. The lamps 20 are spaced at regular intervals along a periphery of the marquee 18.

As best shown in FIG. 2, to allow the plurality of lamps 20 on one gaming machine 10 to flash in synchronization with the lamps on adjacent gaming machines, the top box display 16 further includes a left sensor 22, a right sensor 24, a left emitter 26, and right emitter 28. The left sensor 22 on a machine is adapted to detect a signal emitted from the right emitter 28 on the left-side adjacent machine. The right sensor 24 on a machine is adapted to detect a signal emitted from the left emitter 26 on the right-side adjacent machine. The sensors 22 and 24 are preferably photo sensors, while the emitters 26 and 28 are preferably miniature lamps or light emitting diodes (LEDs). The signals emitted from the respective emitters 26 and 28 are preferably pulses of a predetermined duration (e.g., 1 millisecond) so that the sensors 22 and 24 are immune to ambient signals such as light.

Figure 3:
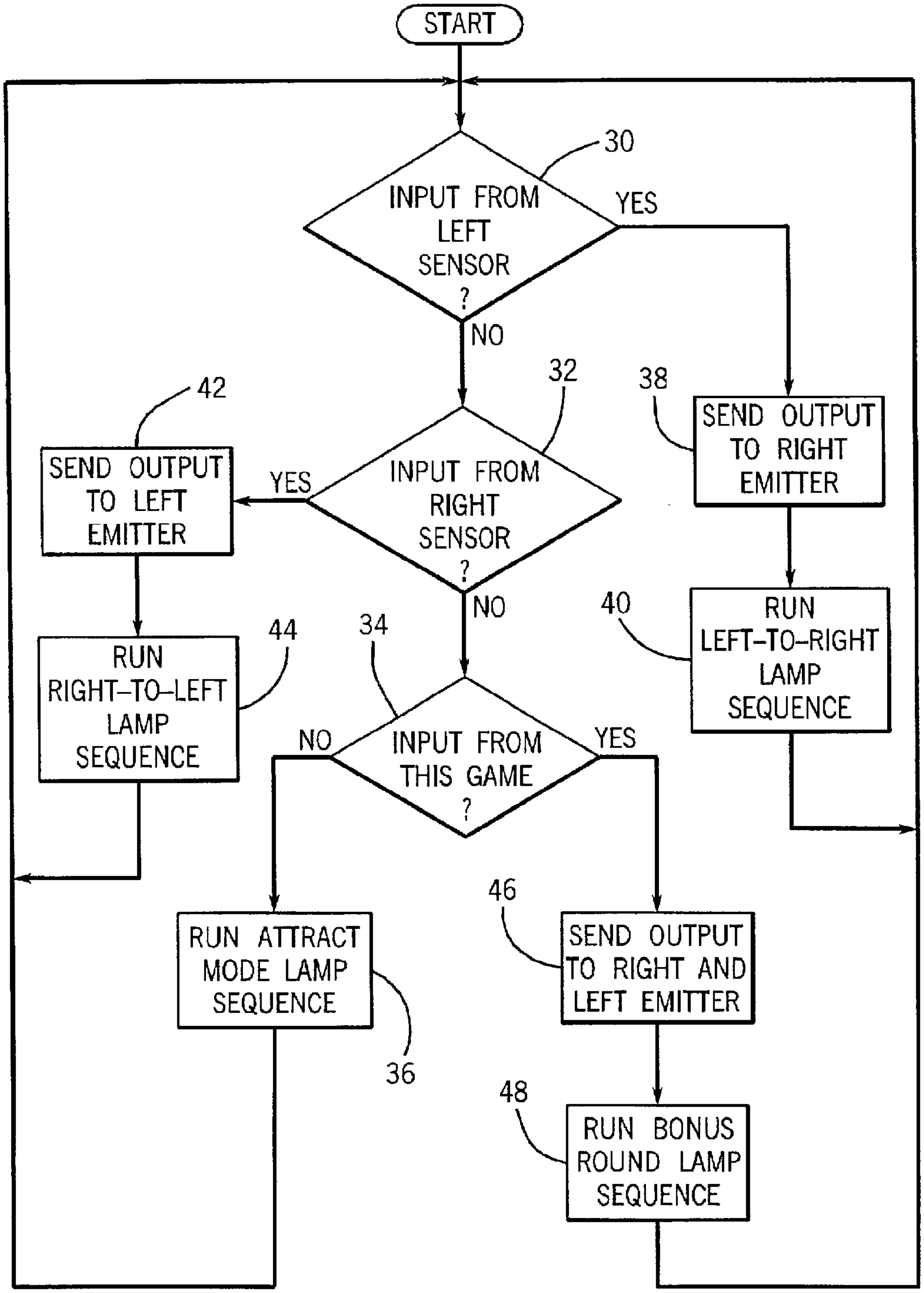
FIG. 3 is a flow diagram of a display program routine for controlling the mode of operation of the top box display of the gaming machine.

FIG. 3 is a flow diagram of a display program routine for controlling the mode of operation of the plurality of lamps 20. The program routine is executed by the CPU of each gaming machine 10. In accordance with the program routine, the plurality of lamps 20 on each machine 10 are operable in one of four possible lamp sequence modes. The four modes include (1) a default attract/standalone mode, (2) a bonus mode, (3) a left-to-right mode, and (4) a right-to-left mode. The program routine executed by each gaming machine 10 selects one of these four modes based on three inputs, which include (1) a left sensor input triggered when the left sensor 22 detects a signal emitted from the right emitter 28 on the left-side adjacent machine; (2) a right sensor input triggered when the right sensor 24 detects a signal emitted from the left emitter 26 on the right-side adjacent machine; and (3) an internal input triggered when a predetermined game-related event, such as a bonus feature or bonus round, occurs in the game executed on the gaming machine 10. The CPU of each gaming machine 10 executes the program routine as follows.

The CPU initially checks for the left sensor input on the CPU's machine (step 30), the right sensor input on the CPU's machine (step 32), and the internal game-related input on the CPU's machine (step 34). If none of these three inputs has been triggered, the predetermined game-related event (e.g., bonus feature or bonus round) has not occurred on any of the gaming machines 10 in the bank. Therefore, the CPU causes the plurality of lamps 20 on the CPU's machine to operate in the default attract mode (step 36). In the default attract mode, the lamps may flash at regular or irregular intervals and, relative to each other, may appear to flash in a variety of patterns (e.g., cascading, alternating, in unison, at random, etc.).

If the left sensor input is triggered at step 30, it means that the predetermined game-related event has occurred on a gaming machine to the left of the CPU's machine. As a result, the CPU causes the plurality of lamps 20 on the CPU's machine to operate in the left-to-right mode (step 40). Also, to cause machines to the right of the CPU's machine to successively (from left to right) enter the left-to-right mode, after a slight delay the CPU causes the right emitter 28 on the CPU's machine to emit a signal (step 38).

If the right sensor input is triggered at step 32, it means that the predetermined game-related event has occurred on a gaming machine to the right of the CPU's machine. As a result, the CPU causes the plurality of lamps 20 on the CPU's machine to operate in the right-to-left mode (step 42). Also, to cause machines to the left of the CPU's machine to successively (from right to left) enter the right-to-left mode, after a slight delay the CPU causes the left emitter 26 on the CPU's machine to emit a signal (step 44).

If the internal input is triggered at step 34, it means that the predetermined game-related event has occurred on the CPU's machine. As a result, the CPU causes the plurality of lamps 20 on the CPU's machine to operate in the bonus mode (step 48). Also, to cause machines to the right of the CPU's machine to successively (from left to right) enter the left-to-right mode, after a slight delay the CPU causes the right emitter 28 on the CPU's machine to emit a signal (step 46). Similarly, to cause machines to the left of the CPU's machine to successively (from right to left) enter the right-to-left mode, after a slight delay the CPU causes the left emitter 26 on the CPU's machine to emit a signal (step 46). The lamps 20 on the machines in the left-to-right mode and the right-to-left mode may flash in a pattern that attracts viewers to the machine in the bonus mode. For example, the lamps on the machines in the left-to-right mode and the right-to-left mode may flash in a moving sequence toward the machine in the bonus mode. Therefore, the machine in the bonus mode becomes the focus of attention.

In response to the internal input being triggered at step 34, the CPU on the machine in the bonus mode may cause its emitters 26 and 28 to emit the respective signals for a predetermined duration, such as for a short time period only at the beginning of the game-related event or for the entire game-related event, thereby controlling when all of the other machines in the bank return to the attract mode from either the left-to-right mode or the right-to-left mode. Furthermore, the order of steps 30, 32, and 34 in the illustrated flow diagram causes the machine in the bank that is first to enter the bonus mode (i.e., the "dominant" machine) to control the lamp sequence modes of all of the other machines in the bank. If the predetermined game-related event subsequently occurs on one of these other machines while the bonus mode of the "dominant" machine is still operating, the second machine does not enter the bonus mode because steps 30 and 32 of the illustrated flow diagram precede and therefore divert flow away from step 34. The order of steps in the flow diagram may, however, be modified.

While the present invention has been described with reference to one or more particular embodiments, those skilled in the art will recognize that many changes may be made thereto without departing from the spirit and scope of the present invention. For example, instead of or in addition to using the marquee 18 and the flashing lamps 20 in the top box display 16, the top box display 16 may employ a dot matrix, CRT, LED, LCD, electro-luminescent, or other type of video display known in the art. Also, the display indicia to be synchronized among the bank of gaming machines may include video elements, such as a video image of a moving object. The video elements may be presented on a video display used in the top box display 16 or on the main video display 12. Each of these embodiments and obvious variations thereof is contemplated as falling within the spirit and scope of the claimed invention, which is set forth in the following claims:

What is claimed is:

1. A method of generating one of a plurality of display indicia on a gaming machine in synchronization with an adjacent gaming machine, the gaming machine including a display, a plurality of emitters, and a plurality of sensors, the method comprising:

detecting a first signal from an emitter of the adjacent machine at one of the plurality of sensors wherein the one of the plurality of sensors is positioned proximally to the emitter of the adjacent gaming machine; and in response to the first signal, generating the one of the plurality of display indicia on the display and emitting a second signal from one of the plurality of emitters, wherein the one of the plurality of display indicia is selected from the plurality of display indicia based on which of the plurality of sensors detects the first signal.

2. The method of claim 1, further including:

detecting a game-related event in a game executed on the gaming machine; and in response to the game-related event, emitting the second signal from the one of the plurality of emitters.

3. The method of claim 2, further including in response to the game-related event, generating another display indicia of the plurality of display indicia on the display.

4. The method of claim 2, wherein the game-related event is a bonus feature.

5. The method of claim 1, wherein the display includes a plurality of lamps, and wherein the step of generating the one of the plurality of display indicia includes sequentially flashing the lamps.

6. The method of claim 1, wherein the first and second signals are light signals, the emitter being a light, the sensor being a photo sensor.

7. The method of claim 1, wherein the display includes a video display, and wherein the step of generating the one of the plurality of display indicia includes displaying an image of a moving object.

8. A gaming machine comprising:

a plurality of emitters, wherein the plurality of emitters is for emitting signals to a plurality of other gaming machines;

a plurality of sensors, wherein the plurality of sensors is for detecting signals from the plurality of other gaming machines; and a display for displaying ones of a plurality of display indicia, wherein the ones of the plurality of display indicia can be selected for display based on which of the plurality of sensors detects a signal.

9. The gaming machine of claim 8, the plurality of emitters includes a right emitter and a left emitter, and wherein the plurality of sensors includes a right sensor and a left sensor.

10. The gaming machine of claim 8, wherein the display includes a plurality of lamps, and wherein the ones of the plurality of display indicia include sequential flashing of the lamps.

11. The gaming machine of claim 10 wherein the plurality of sensors includes a right sensor and a left sensor, and wherein the sequential flashing of the lamps includes, if the right sensor detects a signal, a left-to-right mode; and if the left sensor detects a signal, a right-to-left mode.

12. The gaming machine of claim 8, wherein the ones of the plurality of display indicia can be selected for display based on a gaming event.

13. The gaming machine of claim 8, wherein the plurality of emitters include light emitters and the plurality of sensors include light sensors.

14. A machine-readable medium storing a set of instructions that, when executed by a gaming machine, cause of the gaming machine to perform operations for generating one of a plurality of display indicia on a gaming machine in synchronization with an adjacent gaming machine, the gaming machine including a display, a plurality of emitters, and a plurality of sensors, the operations comprising:

detecting a first signal from an emitter of the adjacent machine at one of the plurality of sensors wherein the one of the plurality of sensors is positioned proximally to the emitter of the adjacent gaming machine; and in response to the first signal, generating the one of the plurality of display indicia on the display and emitting a second signal from one of the plurality of emitters, wherein the one of the plurality of display indicia is selected from the plurality of display indicia based on which of the plurality of sensors detects the first signal.

15. The machine-readable medium of claim 14, the operations further comprising:

detecting a game-related event in a game executed on the gaming machine; and in response to the game-related event, emitting the second signal from the one of the plurality of emitters.

16. The machine-readable medium of claim 15, the operations further comprising:

in response to the game-related event, generating another display indicia of the plurality of display indicia on the display.

17. The machine-readable medium of claim 15, wherein the game-related event is a bonus feature.

18. The machine-readable medium of claim 14, wherein the display includes a plurality of lamps, and wherein the step of generating the one of the plurality of display indicia includes sequentially flashing the lamps.

19. The machine-readable medium of claim 14, wherein the first and second signals are light signals, the emitter being a light, the sensor a photo sensor.

20. The machine-readable medium of claim 14, wherein the display includes a video display, and wherein the step of generating the one of the plurality of display indicia includes displaying an image of a moving object.

* * * * *

UNITED STATES PATENT AND TRADEMARK OFFICE

CERTIFICATE OF CORRECTION

PATENT NO. : 6,923,720 B2
DATED : August 2, 2005
INVENTOR(S) : Timothy C. Loose

It is certified that error appears in the above-identified patent and that said Letters Patent is hereby corrected as shown below:

Column 5,
Line 43, after “claim 8,” insert -- wherein --.
Line 51, after “claim 10,” insert -- , --.

Signed and Sealed this

Fourth Day of April, 2006

JON W. DUDAS
*Director of the United States Patent and Trademark Office*